(12) United States Patent
Zhang

(10) Patent No.: US 8,923,869 B2
(45) Date of Patent: Dec. 30, 2014

(54) HANDOVER METHOD AND SYSTEM IN RELAY NETWORK, RELAY NODE, CONTROL BASE STATION AND BASE STATION

(71) Applicant: Huawei Technologies Co., Ltd., Shenzhen (CN)

(72) Inventor: Tao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/826,358

(22) Filed: Mar. 14, 2013

(65) Prior Publication Data
US 2013/0196667 A1 Aug. 1, 2013

Related U.S. Application Data

(63) Continuation of application No. 13/535,924, filed on Jun. 28, 2012, which is a continuation of application No. PCT/CN2010/079979, filed on Dec. 20, 2010.

(30) Foreign Application Priority Data

Dec. 31, 2009 (CN) .......................... 2009 1 0258944

(51) Int. Cl.
| | |
|---|---|
| *H04W 36/00* | (2009.01) |
| *H04W 36/16* | (2009.01) |
| *H04W 8/26* | (2009.01) |
| *H04W 48/10* | (2009.01) |
| *H04W 48/14* | (2009.01) |
| *H04W 76/02* | (2009.01) |
| *H04W 84/04* | (2009.01) |
| *H04B 7/155* | (2006.01) |

(52) U.S. Cl.
CPC ........ *H04W 36/165* (2013.01); *H04W 36/0005* (2013.01); *H04W 8/26* (2013.01); *H04W 48/10* (2013.01); *H04W 48/14* (2013.01); *H04W 76/02* (2013.01); *H04W 84/047* (2013.01); *H04B 7/155* (2013.01)
USPC .......................................................... 455/439

(58) Field of Classification Search
USPC ................... 455/436–448, 466, 432.1, 426.1; 370/331, 328, 338
See application file for complete search history.

(56) References Cited

U.S. PATENT DOCUMENTS

| | | | |
|---|---|---|---|
| 5,790,938 A | 8/1998 | Talarmo | |
| 8,406,192 B2 | 3/2013 | Cai et al. | |

(Continued)

FOREIGN PATENT DOCUMENTS

| | | |
|---|---|---|
| CN | 101473677 A | 7/2007 |
| CN | 101175304 | 5/2008 |

(Continued)

OTHER PUBLICATIONS

*Joint PDCP protocols on Uu and Un interfaces to improve type-I relay handover*, 3GPP TSG RAN WG2 Meeting #66bis, R2-093735, Los Angeles, Jun. 29-Jul. 3, 2009, pp. 1-9.

(Continued)

*Primary Examiner* — Brandon Miller
(74) *Attorney, Agent, or Firm* — Staas & Halsey LLP

(57) ABSTRACT

Embodiments of the present invention provide a handover method and system in a relay network, a relay node, a control base station and a base station. The method includes: receiving, by a relay node, a first area identifier that identifies the relay node; sending a system information broadcast message carrying the first area identifier to a terminal in a coverage area; receiving a handover request message forwarded by a control base station; and performing, according to the handover request message, a control operation of accessing the relay node on the terminal. The first area identifier that identifies the relay node is allocated to the relay node, so that the terminal in the relay network can be normally handed over from the base station to the relay node.

9 Claims, 9 Drawing Sheets

(56) References Cited

U.S. PATENT DOCUMENTS

| | | | |
|---|---|---|---|
| 2003/0008669 | A1 | 1/2003 | Stein et al. |
| 2007/0249347 | A1* | 10/2007 | Saifullah et al. ............. 455/436 |
| 2007/0293224 | A1 | 12/2007 | Wang et al. |
| 2008/0267128 | A1 | 10/2008 | Bennett et al. |
| 2008/0318574 | A1 | 12/2008 | Bi |
| 2010/0061339 | A1 | 3/2010 | Kim et al. |
| 2010/0103845 | A1* | 4/2010 | Ulupinar et al. ............. 370/254 |
| 2010/0234028 | A1 | 9/2010 | Narasimha et al. |
| 2010/0279601 | A1 | 11/2010 | Phan et al. |
| 2011/0080890 | A1* | 4/2011 | Cai et al. ....................... 370/331 |
| 2011/0080892 | A1 | 4/2011 | Cai et al. |
| 2011/0086639 | A1 | 4/2011 | Kalervo et al. |
| 2011/0243097 | A1 | 10/2011 | Lindqvist et al. |
| 2011/0269460 | A1* | 11/2011 | Dalsgaard et al. ......... 455/435.1 |
| 2012/0220214 | A1* | 8/2012 | Du et al. ........................... 455/7 |

FOREIGN PATENT DOCUMENTS

| | | | |
|---|---|---|---|
| CN | 101257705 | | 9/2008 |
| CN | 101267240 | | 9/2008 |
| CN | 101291527 | | 10/2008 |
| CN | 101547485 | | 9/2009 |
| CN | 101578782 | | 11/2009 |
| CN | 101668324 | | 3/2010 |
| EP | 0740888 | | 4/1999 |
| EP | 1775983 | | 4/2007 |
| RU | 2308810 | C2 | 10/2007 |
| WO | 2008/021195 | | 2/2008 |
| WO | WO2008060021 | * | 5/2008 ............... H04B 7/26 |
| WO | 2009/077418 | A1 | 6/2009 |
| WO | 2009/106615 | A1 | 9/2009 |
| WO | 2009/107910 | | 9/2009 |

OTHER PUBLICATIONS

Office Action, dated Nov. 5, 2012, in corresponding Chinese Application No. 200910258944.8 (5 pp.).

Office Action, dated May 15, 2013, in corresponding U.S. Appl. No. 13/535,924 (19 pp.).

*Joint PDCP protocols on Uu and Un interfaces to improve type-I relay hardcover*, 3GPP TSG RAN WG2 Meeting #66bis, R2-093735, Jun. 29-Jul. 3, 2009, pp. 1-9.

Written Opinion of the International Searching Authority, dated Mar. 31, 2011, in corresponding International Application No. PCT/CN2010/079979 (3 pp.).

Chinese Search Report, dated Oct. 24, 2012, in corresponding Chinese Application No. 2009102589448 (2 pp.).

International Search Report of Corresponding PCT Application PCT/CN2010/079979 mailed Mar. 31, 2011.

Extended European Search Report issued Nov. 6, 2012 in corresponding PCT Application No. PCT/CN2010079979.

"Type 1 Relay Architecture", III, Coiler, Jul. 3, 2009, 3GPP TSG-RAN WG2 #66bis, pp. 1-12.

"On the Design of Relay Mode for LTE-Advanced", Texas Instruments, Feb. 13, 2009, 3GPP TSG Ran WG1 #56, pp. 1-11.

"Report of Email Discussion [66#22] on Relay Architecture", Email Discussion Rapporteur (NTT DOCOMO, Inc.), Jul. 3, 2009, 3GPP TSG-RAN WG2 #66bis, pp. 1-30.

"Startup of Relay Node", Ericsson, St Ericsson, Jul. 3, 2009, 3GPP TSG-RAN WG2 #66bis, pp. 1-4.

"$3^{rd}$ Generation Partnership Project; Technical Specification Group Radio Acess Network (E-UTRA); Evolved Universal Terrestrial Radio Access Network (E-UTRAN); Overall Description; Stage 2 (Release 9)", Sep. 2009, 3GPP TS 36.300, pp. 1-164.

"$3^{rd}$ Generation Partnership Project; Technical Specification Group Radio Access Network; Evolved Universal Terrestrial Radio Access (E-UTRA); Relay Architecture for E-UTRA (LTE-Advanced) (Release 9)", Nov. 2009, 3GPP TR 36.806, pp. 1-25.

"Architecture Options Comparison: UE Mobility Support", Fujitsu, Nov. 13, 2009, 3GPP TSG-RAN WG3 #66, pp. 1-8.

"Handover Optimization", NEC, Nov. 13, 2009, 3GPP TSG-RAN WG3 Meeting #66, pp. 1-4.

"Support for Nomadic Relay-eNB-s", Ericsson, Nov. 13, 2009, 3GPP TSG-RAN WG3 #66, pp. 1-2.

"$3^{rd}$ Generation Partnership Project; Technical Specification Group Radio Access Network; Evolved Universal Terrestrial Radio Access Network (E-UTRAN); S1 Application Protocol (S1AP) (Release 9)", Dec. 2009, 3Gpp TS 36.413, pp. 1-236.

$3^{rd}$ Generation Partnership Project; Technical Specification Group Radio Access Network; Evolved Universal Terrestrial Radio Access Network (E-UTRAN); X2 Application Protocol (X2AP) (Release 9), Dec. 2009, 3GPP TS 36.423, pp. 1-114.

Restriction Requirement, dated Jan. 24, 2013, in corresponding U.S. Appl. No. 13/535,924 (6 pp.).

Office Action, dated Sep. 6, 2013, in corresponding U.S. Appl. No. 13/535,924 (15 pp.).

Chinese Office Action mailed Jul. 11, 2013 in corresponding Chinese Application No. 200910258944.8.

Russian Office Action mailed Nov. 29, 2013 in corresponding Russian Application No. 2012132642.

Notice of Allowance mailed Apr. 30, 2014 in U.S. Appl. No. 13/535,924.

Notice of Allowance issued on Jan. 8, 2014 in copending U.S. Appl. No. 13/535,924.

Corrected Notice of Allowance issued on Apr. 7, 2014 in copending U.S. Appl. No. 13/535,924.

* cited by examiner

HANDOVER METHOD AND SYSTEM IN RELAY NETWORK, RELAY NODE, CONTROL BASE STATION AND BASE STATION

CROSS-REFERENCE TO RELATED APPLICATIONS

This application is a continuation of U.S. patent application Ser. No. 13/535,924, filed on Jun. 28, 2012, which is a continuation of International Application No. PCT/CN2010/079979, filed on Dec. 20, 2010, which claims priority to Chinese Patent Application No. 200910258944.8, filed on Dec. 31, 2009, both of which are hereby incorporated by reference in their entireties.

FIELD OF THE INVENTION

The embodiments of the present invention relate to the field of mobile communications technologies, and in particular, to a handover method and system in a relay network, a relay node, a control base station and a base station.

BACKGROUND OF THE INVENTION

In a mobile communication network, a mobility management entity (Mobility Management Entity; MME) is used to perform operations such as saving mobility management context and user authentication on a terminal (User Equipment; UE) in a coverage area of a base station (E-UTRAN Node B; eNB). The eNB and the MME are connected through an S1 interface, and the eNBs are connected through an X2 interface. When the UE moves from a coverage area of one eNB to a coverage area of another eNB, the UE needs to be handed over from the first eNB to the second eNB.

In a conventional network, an eNB and a UE are connected through a wireless network, that is, a single-hop network. However, in a relay network, one or more relay nodes (Relay Node; RN) are added between an eNB and a UE, and are responsible for forwarding a radio signal sent by the eNB one time or multiple times to the UE. Taking a simple two-hop relay as an example, one eNB-UE radio link is divided into two radio links, namely, eNB-RN and RN-UE, thereby having the opportunity to replace one poor-quality link with two good-quality links, so as to achieve higher link capacity and a better coverage. The RN and a control base station (Donor E-UTRAN Node B; DeNB) that controls the RN are connected through a radio S1 interface and X2 interface. When the DeNB acts as an agent between the RN and an MME, the DeNB forwards an S1 message between the RN and the MME through the S1 interface, and when the DeNB acts as an agent between the RN and a base station adjacent to the RN, the DeNB forwards an X2 message between the RN and the base stations adjacent to the RN through an X2 interface.

In a convention network, when no X2 interface is available between two eNBs due to some reason, for example, when connection between the eNBs is interrupted due to external causes, if a UE is handed over from one eNB to another eNB, handover needs to be performed through an S1 interface connected to the MME, that is, a first eNB sends a handover request to a second eNB through the MME. However, in a relay network, when no X2 interface is available between an eNB and a DeNB, if a UE is handed over from the eNB to a RN that is controlled by the DeNB, as the MME cannot determine the DeNB corresponding to the RN, a handover request cannot be correctly sent, causing that the handover process cannot be performed normally.

SUMMARY OF THE INVENTION

Embodiments of the present invention provide a handover method and system in a relay network, a relay node, a control base station and a base station, so as to implement a normal handover in a relay network.

An embodiment of the present invention provides a handover method in a relay network, where the method includes:

receiving, by a relay node, a first area identifier that identifies the relay node;

sending a system information broadcast message carrying the first area identifier to a terminal in a coverage area; and receiving a handover request message, which is forwarded by a control base station according to the first area identifier, and performing, according to the handover request message, a control operation of accessing the relay node on the terminal.

An embodiment of the present invention further provides a handover method in a relay network, where the method includes:

sending, by a control base station, a response message to a relay node according to a received interface setup request message, where the response message carries a first area identifier that identifies the relay node and is allocated to the relay node; and receiving a handover request message, which is sent by a mobility management entity according to the first area identifier, and forwarding the handover request message to the relay node, so that the relay node performs, according to the handover request message, a control operation of accessing the relay node on a terminal.

An embodiment of the present invention further provides a handover method in a relay network, where the method includes:

receiving, by a base station, a measurement report sent by a terminal, where the measurement report carries a first area identifier obtained by the terminal from a system information broadcast message that is received from a relay node; and sending a handover required message to a mobility management entity according to the first area identifier, so that the mobility management entity sends, according to the first area identifier, a handover request message to a control base station that controls the relay node, where the handover request message indicates that the terminal requests to be handed over from the base station to the relay node.

An embodiment of the present invention provides a relay node, including:

a first receiving module, configured to receive a first area identifier that identifies a relay node and a handover request message that is forwarded by a control base station according to the first area identifier;

a first sending module, configured to send a system information broadcast message carrying the first area identifier that is received by the first receiving module to a terminal in a coverage area; and a processing module, configured to perform, according to the handover request message that is received by the first receiving module, a control operation of accessing the relay node on the terminal.

An embodiment of the present invention provides a control base station, including:

a second sending module, configured to send a response message to a relay node according to a received interface setup request message, where the response message carries a first area identifier that identifies the relay node and is allocated to the relay node; and a second receiving module, configured to receive a handover request message sent by a mobility management entity according to the first area identifier, and forward the handover request message to the relay node.

An embodiment of the present invention provides a base station, including:

a third receiving module, configured to receive a measurement report sent by a terminal, where the measurement report carries a first area identifier obtained by the terminal from a system information broadcast message that is received from a relay node; and a third sending module, configured to send, according to the first area identifier, a handover required message to a mobility management entity, so that the mobility management entity sends, according to the first area identifier, a handover request message to a control base station that controls the relay node, where the handover request message indicates that the terminal requests to be handed over from the base station to the relay node.

An embodiment of the present invention provides a handover system in a relay network, where the system includes: a relay node, a control base station, a base station and a mobility management entity.

The relay node is configured to receive a first area identifier that identifies the relay node; send a system information broadcast message carrying the first area identifier to a terminal in a coverage area; receive a handover request message, which is forwarded by the control base station according to the first area identifier; and perform, according to the handover request message, a control operation of accessing the relay node on the terminal.

The control base station is configured to send a response message to the relay node according to a received interface setup request message, where the response message carries the first area identifier that identifies the relay node and is allocated to the relay node; receive a handover request message that is sent by the mobility management entity according to the first area identifier; and forward the handover request message to the relay node, so that the relay node performs, according to the handover request message, a control operation of accessing the relay node on the terminal.

The base station is configured to receive a measurement report that is sent by the terminal, where the measurement report carries the first area identifier obtained by the terminal from the system information broadcast message that is received from the relay node; according to the first area identifier, send a handover required message to the mobility management entity, so that the mobility management entity sends, according to the first area identifier, a handover request message to the control base station that controls the relay node, where the handover request message indicates that the terminal requests to be handed over from the base station to the relay node.

Through the handover method and system in a relay network, the relay node, the control base station and the base station according to the embodiments of the present invention, the first area identifier that identifies the RN is allocated to the RN, a UE can be normally handed over from the eNB to the RN in a relay network.

BRIEF DESCRIPTION OF THE DRAWINGS

To illustrate the technical solutions in the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art may further obtain other drawings according to these accompanying drawings without creative efforts.

DETAILED DESCRIPTION OF THE EMBODIMENTS

In order to make the objectives, technical solutions, and advantages of the embodiments of the present invention more comprehensible, the technical solutions in the embodiments of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
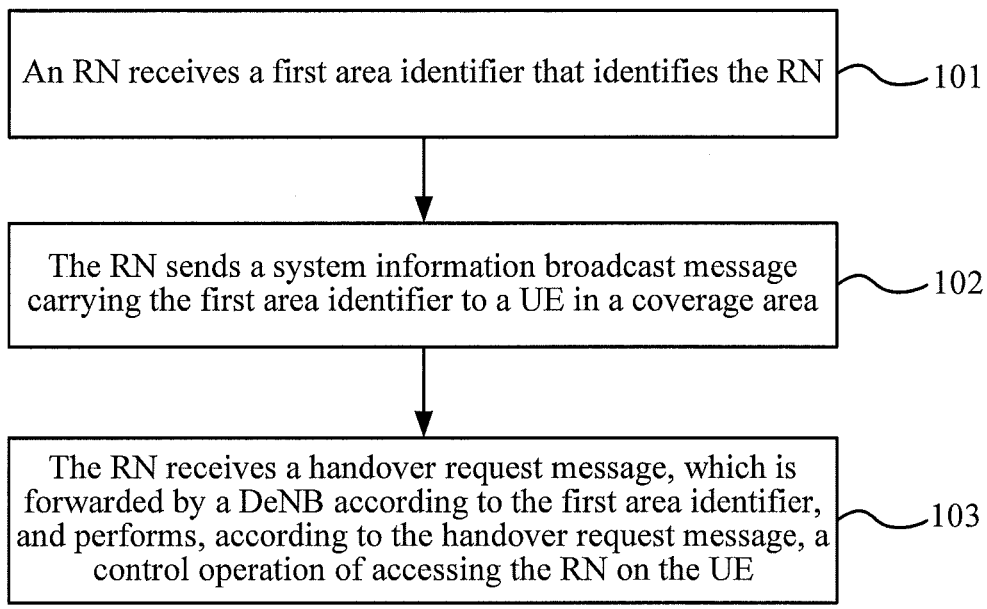
FIG. 1 is a flow chart of an embodiment of a handover method in a relay network according to the present invention.

FIG. 1 is a flow chart of an embodiment of a handover method in a relay network according to the present invention.

As shown in FIG. 1, the handover method in a relay network provided by an embodiment of the present invention includes the following:

Step 101: An RN receives a first area identifier that identifies the RN.

Step 102: The RN sends a system information broadcast message carrying the first area identifier to a UE in a coverage area.

Step 103: The RN receives a handover request message, which is forwarded by a DeNB according to the first area identifier, and performs, according to the handover request message, a control operation of accessing the RN on the UE.

In the embodiment of the present invention, when an interface is setup between the RN and the DeNB, the DeNB allocates the first area identifier to the RN. For example, the first area identifier may be a first evolved universal terrestrial radio access network cell global identifier (EUTRAN Cell Global Identifier; ECGI) or a first tracking area identity (Tracking Area Identity; TAI), and so on. After receiving the first area identifier allocated by the DeNB, the RN sends a system information broadcast message carrying the first area identifier to all UEs in the coverage area. When a certain UE that is in a connection state moves from a cell of an eNB to a cell of the RN, the UE receives the system information broadcast message that carries the first area identifier and is sent by the RN, and reports the system information broadcast message to the eNB. In this embodiment, the eNB or an MME may further obtain an identifier of the DeNB (DeNB_ID) according to the first area identifier, so the eNB can further send a handover request message of handing over from the eNB to the RN to a DeNB of the RN through the MME. After receiving the handover request message forwarded by the DeNB, the RN performs, according to the handover request message, a control operation of accessing the RN on the UE.

Through the handover method in a relay network according to the embodiment of the present invention, when an interface is set up between the RN and the DeNB, the DeNB allocates a first area identifier that identifies the RN to the RN, so that the UE can be normally handed over from the eNB to the RN in the relay network.

Figure 2:
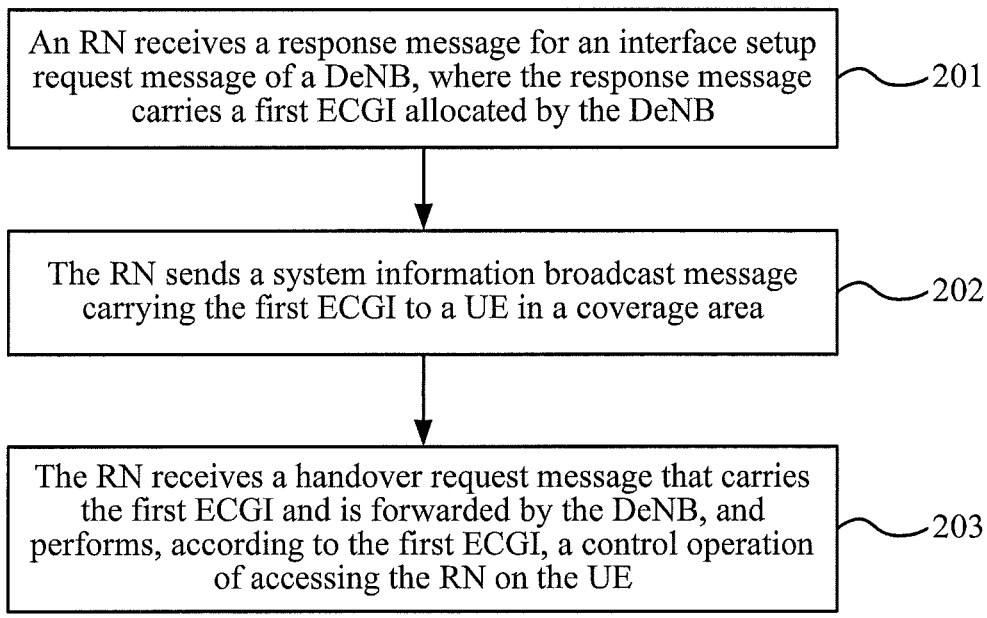
FIG. 2 is a flow chart of an embodiment of another handover method in a relay network according to the present invention.

FIG. 2 is a flow chart of an embodiment of another handover method in a relay network according to the present invention. As shown in FIG. 2, the method provided by an embodiment of the present invention may include the following:

Step 201: An RN receives a response message for an interface setup request message of a DeNB, where the response message carries a first ECGI allocated by the DeNB.

The interface setup request message includes an X2 interface setup request message, and the response message includes an X2 response message corresponding to the X2 interface setup request message. The first ECGI includes an identifier of the DeNB (DeNB_ID).

Step 202: The RN sends a system information broadcast message carrying the first ECGI to a UE in a coverage area.

Step 203: The RN receives a handover request message that carries the first ECGI and is forwarded by the DeNB, and performs, according to the first ECGI, a control operation of accessing the RN on the UE.

In the embodiment of the present invention, when an X2 interface is set up between the RN and the DeNB, the DeNB allocates the first ECGI to the RN. After receiving the first ECGI allocated by the DeNB, the RN sends a system information broadcast message carrying the first ECGI to all UEs in the coverage area. When a certain UE that is in a connection state moves from a cell of an eNB to a cell of the RN, the UE receives the system information broadcast message that car-ries the first ECGI and is sent by the RN, and reports the system information broadcast message to the eNB; and the eNB further sends the handover request message of handing over from the eNB to the RN to a DeNB of the RN through the MME. Because the first ECGI is allocated by the DeNB, the first 20 bits represent an identifier of the DeNB (DeNB_ID), so the eNB or the MME can obtain the DeNB_ID according to the first ECGI, and the eNB sends the handover request message to the DeNB through the MME. After receiving the handover request message forwarded by the DeNB, the RN performs, according to the handover request message, a control operation of accessing the RN on the UE.

Through the handover method in a relay network according to the embodiment of the present invention, when an interface is set up between the RN and the DeNB, the DeNB allocates a first ECGI that identifies the RN to the RN, so that the eNB can obtain the DeNB_ID according to the first ECGI and the UE can be normally handed over from the eNB to the RN in the relay network.

Figure 3:
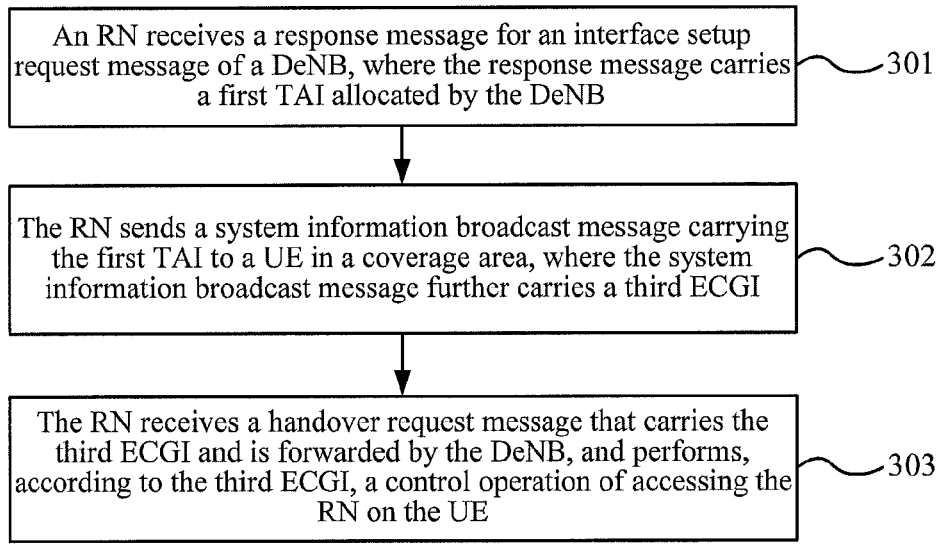
FIG. 3 is a flow chart of an embodiment of still another handover method in a relay network according to the present invention.

FIG. 3 is a flow chart of an embodiment of another handover method in a relay network according to the present invention. As shown in FIG. 3, an embodiment of the present invention provides a handover method in a relay network, which includes the following:

Step 301: An RN receives a response message for an interface setup request message of a DeNB, where the response message carries a first TAI allocated by the DeNB.

The interface setup request message includes an X2 interface setup request message or an S1 interface setup request message, and the X2 interface setup request message carries a third ECGI to be reported to the DeNB. The response message includes an X2 response message corresponding to the X2 interface setup request message or an S1 response message corresponding to the S1 interface setup request message. The first TAI is corresponding to a DeNB_ID uniquely.

Step 302: The RN sends a system information broadcast message carrying the first TAI to a UE in a coverage area, where the system information broadcast message further carries a third ECGI.

Step 303: The RN receives a handover request message that carries the third ECGI and is forwarded by the DeNB, and performs, according to the third ECGI, a control operation of accessing the RN on the UE.

In the embodiment of the present invention, when an X2 interface is set up between the RN and the DeNB, the RN reports the third ECGI to the DeNB. When an S1 interface is set up between the RN and the DeNB, the DeNB allocates the first TAI to the RN, and the following principles are followed when the DeNB allocates the first TAI to the RN: different TAIs are allocated to RNs under different DeNBs, and no TAI shared by DeNBs is allocated to the RN. After receiving the first TAI allocated by the DeNB, the RN sends a system information broadcast message carrying the first TAI and the third ECGI to all UEs in the coverage area. When a certain UE that is in a connection state moves from a cell of an eNB to a cell of the RN, the UE receives the system information broadcast message that carries the first TAI and the third ECGI and is sent by the RN, and reports the system information broadcast message to the eNB; and the eNB further sends the handover request message of handing over from the eNB to the RN to a DeNB of the RN through the MME. Because the first TAI is corresponding to a DeNB_ID uniquely, the MME can obtain the DeNB_ID according to the first TAI, and send the handover request message to the DeNB. After receiving the handover request message forwarded by the DeNB, the RN performs, according to the handover request message, a control operation of accessing the RN on the UE.

Through the handover method in a relay network according to the embodiment of the present invention, when an interface is set up between the RN and the DeNB, the DeNB allocates a first TAI that identifies the RN to the RN, so that the MME can obtain the DeNB_ID according to the first TAI, and the UE can be normally handed over from the eNB to the RN in the relay network.

Figure 4:
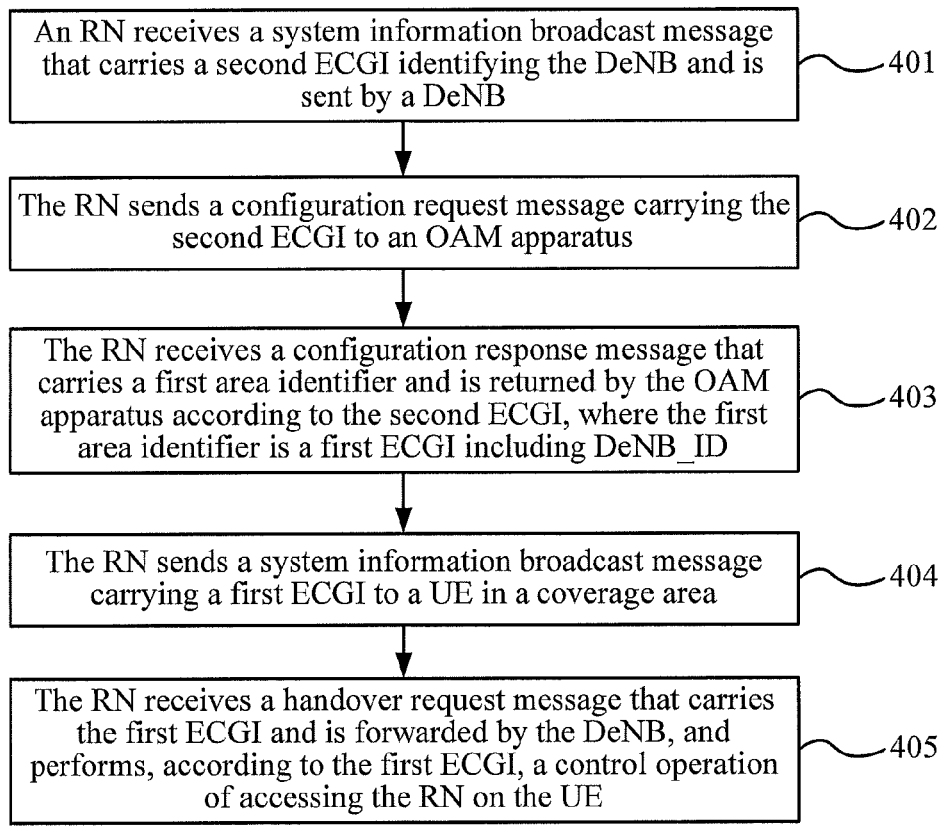
FIG. 4 is a flow chart of an embodiment of still another handover method in a relay network according to the present invention.

FIG. 4 is a flow chart of an embodiment of still another handover method in a relay network according to the present invention. As shown in FIG. 4, an embodiment of the present invention provides a handover method in a relay network, which includes the following:

Step 401: An RN receives a system information broadcast message that carries a second ECGI identifying the DeNB and is sent by a DeNB.

Step 402: The RN sends a configuration request message carrying the second ECGI to an operation administration and maintenance (Operation Administration and Maintenance; OAM) apparatus.

Step 403: The RN receives a configuration response message that carries a first area identifier and is returned by the OAM apparatus according to the second ECGI, where the first area identifier is a first ECGI including DeNB_ID.

Step 404: The RN sends a system information broadcast message carrying a first ECGI to a UE in a coverage area.

Step 405: The RN receives a handover request message that carries the first ECGI and is forwarded by the DeNB, and performs, according to the first ECGI, a control operation of accessing the RN on the UE.

Step 404-step 405 in this embodiment are the same as step 202-step 203 in the method embodiment shown in FIG. 2, and the difference lies in that, in this embodiment, before an interface is set up between the RN and the DeNB, the RN first receives the system information broadcast message that carries the second ECGI and is sent by the DeNB, and then sends a configuration request message carrying the second ECGI to the OAM apparatus, and the OAM apparatus allocates a first ECGI that is not used by the DeNB to the RN according to the second ECGI that identifies the DeNB, so as to identify the RN. Or, when the RN receives the system information broadcast message that carries the second ECGI and is sent by the DeNB, because the first 20 bits of the second ECGI represent the DeNBID, the RN may directly obtain the DeNB_ID, and send the configuration request message carrying the DeNB_ID to the OAM apparatus, and the OAM apparatus allocates the first ECGI that is not used by the DeNB to the RN according to the DeNB_ID, so as to identify the RN.

Through the handover method in a relay network according to the embodiment of the present invention, before an interface is set up between the RN and the DeNB, the OAM apparatus allocates the first ECGI that identifies the RN for the RN, so that the UE can be normally handed over from an eNB to the RN in the relay network.

Figure 5:
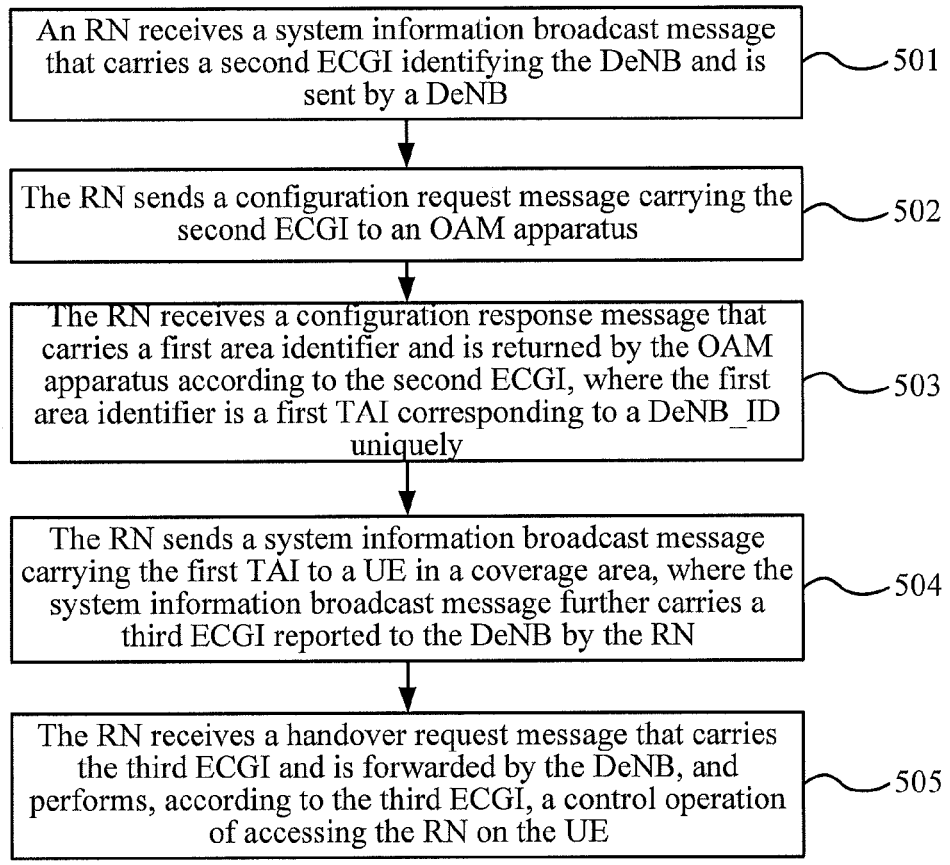
FIG. 5 is a flow chart of an embodiment of still another handover method in a relay network according to the present invention.

FIG. 5 is a flow chart of an embodiment of still another handover method in a relay network according to the present invention. As shown in FIG. 5, an embodiment of the present invention provides a handover method in a relay network, which includes the following:

Step 501: An RN receives a system information broadcast message that carries a second ECGI identifying the DeNB and is sent by a DeNB.

Step 502: The RN sends a configuration request message carrying the second ECGI to an OAM apparatus.

Step 503: The RN receives a configuration response message that carries a first area identifier and is returned by the OAM apparatus according to the second ECGI, where the first area identifier is a first TAI corresponding to a DeNB_ID uniquely.

Step 504: The RN sends a system information broadcast message carrying the first TAI to a UE in a coverage area, where the system information broadcast message further carries a third ECGI to be reported to the DeNB by the RN.

Step 505: The RN receives a handover request message that carries the third ECGI and is forwarded by the DeNB, and performs, according to the third ECGI, a control operation of accessing the RN on the UE.

Step 504-step 505 in this embodiment are the same as step 302-step 303 in the method embodiment shown in FIG. 3, and the difference lies in that, in this embodiment, before an interface is set up between the RN and the DeNB, the RN first receives the system information broadcast message that carries the second ECGI and is sent by the DeNB, and then sends the configuration request message carrying the second ECGI to the OAM apparatus, and the OAM apparatus allocates the first TAI to the RN according to the second ECGI that identifies the DeNB. Or, when the RN receives the system information broadcast message that carries the second ECGI and is sent by the DeNB, because the first 20 bits of the second ECGI represent the DeNB_ID, the RN may directly obtain the DeNB_ID, and send the configuration request message carrying the DeNB_ID to the OAM apparatus, and the OAM apparatus allocates the first TAI to the RN according to the DeNB_ID. In the two cases above, the following principles are followed when the OAM allocates the first TAI to the RN: different TAIs are allocated to RNs under different DeNBs, and no TAI shared by DeNBs is allocated to the RN. The first TAI allocated following this principle is corresponding to a DeNB_ID uniquely, so an MME can obtain the DeNB_ID according to the first TAI, and send the handover request message to the DeNB.

Through the handover method in a relay network according to the embodiment of the present invention, before an interface is set up between the RN and the DeNB, the OAM apparatus allocates the first TAI uniquely corresponding to a DeNB to the RN, so that the UE can be normally handed over from an eNB to the RN in the relay network.

Figure 6:
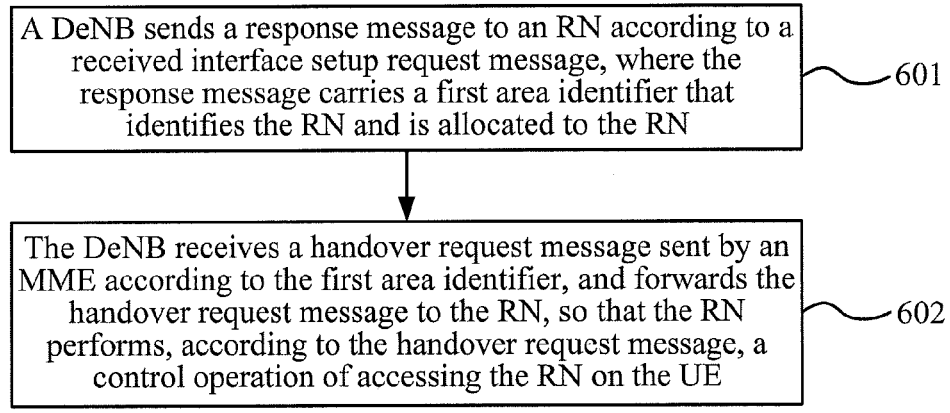
FIG. 6 is a flow chart of an embodiment of still another handover method in a relay network according to the present invention.

FIG. 6 is a flow chart of an embodiment of still another handover method in a relay network according to the present invention. As shown in FIG. 6, an embodiment of the present invention provides a handover method in a relay network, which includes the following:

Step 601: A DeNB sends a response message to an RN according to a received interface setup request message, where the response message carries a first area identifier that identifies the RN and is allocated to the RN.

Step 602: The DeNB receives a handover request message sent by an MME according to the first area identifier, and forwards the handover request message to the RN, so that the RN performs, according to the handover request message, a control operation of accessing the RN on the UE.

In the embodiment of the present invention, when an interface is set up between the RN and the DeNB, the DeNB allocates the first area identifier to the RN, for example, the first area identifier may be a first ECGI or a first TAI. After receiving the first area identifier allocated by the DeNB, the RN sends a system information broadcast message carrying the first area identifier to all UEs in a coverage area. When a certain UE that is in a connection state moves from a cell of an eNB to a cell of the RN, the UE receives the system information broadcast message carrying the first area identifier, and reports the system information broadcast message to the eNB. In this embodiment, the eNB or the MME may obtain DeN- B_ID according to the first area identifier, so the eNB can further send the handover request message of handing over from the eNB to the RN to a DeNB of the RN through the MME. After receiving the handover request message sent by the MME, the DeNB forwards the handover request message to the RN, so that the RN performs, according to the handover request message, a control operation of accessing the RN on the UE.

Through the handover method in a relay network according to the embodiment of the present invention, when an interface is set up between the RN and the DeNB, the DeNB allocates a first area identifier that identifies the RN to the RN, so that the UE can be normally handed over from the eNB to the RN in the relay network.

Further, the interface setup request message includes an X2 interface setup request message. The response message includes an X2 response message corresponding to the X2 interface setup request message. The allocated first area identifier is a first ECGI carried in the X2 response message, and the first ECGI includes an identifier of the DeNB (DeNB_ID).

In the embodiment of the present invention, when an X2 interface is set up between the RN and the DeNB, the DeNB allocates the first ECGI to the RN. After receiving the first ECGI allocated by the DeNB, the RN sends a system information broadcast message carrying the first ECGI to all UEs in the coverage area. When a certain UE that is in a connection state moves from a cell of the eNB to a cell of the RN, the UE receives the system information broadcast message that carries the first ECGI and is sent by the RN, and reports the system information broadcast message to the eNB; and eNB further sends a handover request message of handing over from the eNB to the RN to a DeNB of the RN through the MME. Because the first ECGI is allocated by the DeNB, and the first 20 bits represent the DeNB_ID, the eNB or the MME can obtain the DeNB_ID according to the first ECGI, and the eNB sends the handover request message to the DeNB through the MME. After receiving the handover request message sent by the MME, the DeNB forwards the handover request message to the RN, so that the RN performs, according to the handover request message, a control operation of accessing the RN on the UE.

Further, the interface setup request message includes an X2 interface setup request message and an S1 interface setup request message, and the X2 interface setup request message carries the a third ECGI to be reported to the DeNB. The response message includes an X2 response message corresponding to the X2 interface setup request message and an S1 response message corresponding to the S1 interface setup request message. The allocated first area identifier is a first TAI carried in the S1 response message, and the first TAI is corresponding to a DeNB_ID uniquely. Meanwhile, after receiving the response message sent by the RN, the DeNB may further send a base station configuration update message to the MME, where the base station configuration update message carries the first TAI, and is used to enable the MME to obtain a corresponding relationship between the first TAI and the DeNBID, so that, when the MME receives the handover required message carrying the first TAI, the MME can obtain the corresponding DeNB_ID according to the first TAI.

In the embodiment of the present invention, when an X2 interface is set up between the RN and the DeNB, the RN reports the third ECGI to the DeNB. When an S1 interface is set up between the RN and the DeNB, the DeNB allocates the first TAI to the RN, and the following principles are followed when the DeNB allocates the first TAI to the RN: different TAIs are allocated to RNs under different DeNBs, and no TAI shared by DeNBs is allocated to the RN. After receiving the first TAI allocated by the DeNB, the RN sends a system information broadcast message carrying the first TAI and the third ECGI to all UEs in the coverage area. When a certain UE that is in a connection state moves from a cell of the eNB to a cell of the RN, the UE receives the system information broadcast message that carries the first TAI and the third ECGI and is sent by the RN, and reports the system information broadcast message to the eNB; and the eNB further sends the handover request message of handing over from the eNB to the RN to a DeNB of the RN through the MME. Because the first TAI is corresponding to a DeNB_ID uniquely, the MME can obtain the DeNB_ID according to the first TAI, and send the handover request message to the DeNB. After receiving the handover request message sent by the MME, the DeNB forwards the handover request message to the RN, so that the RN performs, according to the handover request message, a control operation of accessing the RN on the UE.

Through the handover method in a relay network according to the embodiment of the present invention, when an interface is set up between the RN and the DeNB, the DeNB allocates a first ECGI or a first TAI that identifiers the RN to the RN, so that the MME can obtain the DeNB_ID according to the first ECGI or the first TAI, so that the UE can be normally handed over from the eNB to the RN in the relay network.

Figure 7:
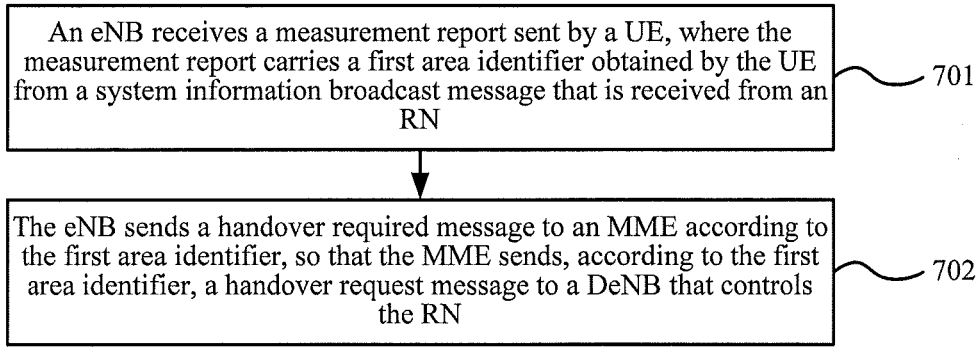
FIG. 7 is a flow chart of an embodiment of still another handover method in a relay network according to the present invention.

FIG. 7 is a flow chart of an embodiment of still another handover method in a relay network according to the present invention. As shown in FIG. 7, an embodiment of the present invention provides a handover method in a relay network, which includes the following:

Step 701: An eNB receives a measurement report sent by a UE, where the measurement report carries a first area identifier obtained by the UE from a system information broadcast message received from an RN.

Step 702: The eNB sends a handover required message to an MME according to the first area identifier, so that the MME sends a handover request message to a DeNB that controls the RN according to the first area identifier, where the handover request message indicates that the UE requests to be handed over from the eNB to the RN.

In the embodiment of the present invention, when an interface is set up between the RN and the DeNB, the DeNB allocates the first area identifier to the RN. For example, the first area identifier may be a first ECGI or a first TAI, and so on. After receiving the first area identifier allocated by the DeNB, the RN sends a system information broadcast message carrying the first area identifier to all UEs in a coverage area. When a certain UE that is in a connection state moves from a cell of the eNB to a cell of the RN, the UE receives the system information broadcast message that carries the first area identifier and is sent by the RN, and further sends a measurement report to the eNB, where the measurement report carries the first area identifier obtained by the UE from the system information broadcast message received from the RN; and in this embodiment, the eNB or the MME may obtain the DeNB_ID according to the first area identifier, so the eNB sends a handover required message to the MME, so that the MME can send the handover request message of handing over from the eNB to the RN to the DeNB of the RN. After receiving the handover request message forwarded by the DeNB, the RN performs, according to the handover request message, a control operation of accessing the RN on the UE.

Through the handover method in a relay network according to the embodiment of the present invention, the first area identifier that identifies the RN is allocated to the RN, so that the UE can be normally handed over from the eNB to the RN in the relay network.

Figure 8:
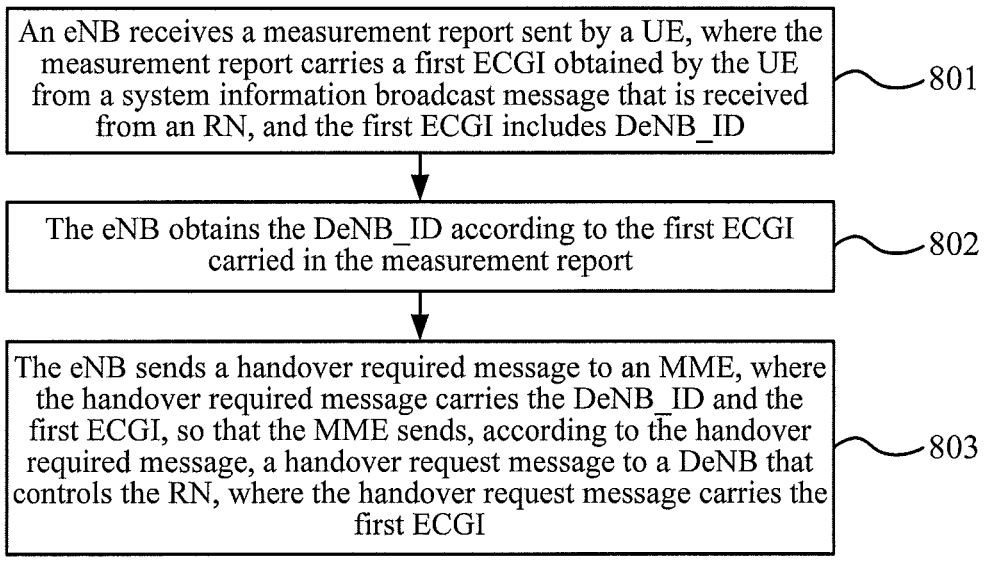
FIG. 8 is a flow chart of an embodiment of still another handover method in a relay network according to the present invention.

FIG. 8 is a flow chart of an embodiment of still another handover method in a relay network according to the present invention. As shown in FIG. 8, an embodiment of the present invention further provides a handover method in a relay network, which includes the following:

Step 801: An eNB receives a measurement report sent by a UE, where the measurement report carries a first ECGI obtained by the UE from a system information broadcast message received from an RN, and the first ECGI includes DeNB_ID.

Step 802: The eNB obtains the DeNB_ID according to the first ECGI carried in the measurement report.

Step 803: The eNB sends a handover required message to an MME, where the handover required message carries the DeNB_ID and the first ECGI, so that the MME sends a handover request message to a DeNB that controls the RN according to the handover required message, where the handover request message carries the first ECGI and indicates that the UE requests to be handed over from the eNB to the RN.

In the embodiment of the present invention, when an X2 interface is set up between the RN and the DeNB, the DeNB allocates the first ECGI to the RN. After receiving the first ECGI allocated by the DeNB, the RN sends a system information broadcast message carrying the first ECGI to all UEs in a coverage area. When a certain HE that is in a connection state moves from a cell of the eNB to a cell of the RN, the UE receives the system information broadcast message that carries the first ECGI and is sent by the RN, and further sends a measurement report to the eNB, where the measurement report carries the first ECGI obtained by the UE from the system information broadcast message received from the RN; and the eNB obtains the DeNB_ID according to the first ECGI, and then sends a handover required message to the MME, where the handover required message carries the DeNB_ID and the first ECGI, so that the MME sends the handover request message of handing over from the eNB to the RN to the DeNB of the RN. Because the first ECGI is allocated by the DeNB, and the first 20 bits represent the DeNB_ID, the eNB can obtain the DeNB_ID according to the first ECGI, and send the handover request message to the DeNB through the MME. After receiving the handover request message forwarded by the DeNB, the RN performs, according to the handover request message, a control operation of accessing the RN on the UE.

Or, the eNB may also directly send a handover required message carrying the first ECGI to the MME, and then the MME obtains the DeNB_ID included in the handover required message according to the first ECGI, and performs subsequent operations.

Through the handover method in a relay network according to the embodiment of the present invention, the first ECGI that identifies the RN is allocated to the RN, so that the eNB can obtain the DeNB_ID according to the first ECGI, and the UE can be normally handed over from the eNB to the RN in the relay network.

Figure 9:
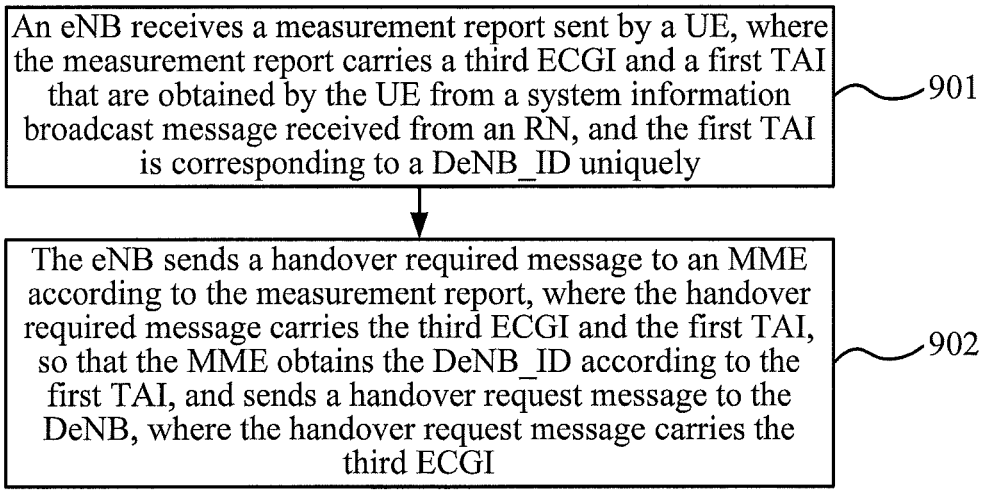
FIG. 9 is a flow chart of an embodiment of still another handover method in a relay network according to the present invention.

FIG. 9 is a flow chart of an embodiment of still another handover method in a relay network according to the present invention. As shown in FIG. 9, an embodiment of the present invention provides a handover method in a relay network, which includes the following:

Step 901: An eNB receives a measurement report sent by a UE, where the measurement report carries a third ECGI and a first TAI that are obtained by the UE from a system information broadcast message received from an RN, and the first TAI is corresponding to a DeNB_ID uniquely.

Step 902: The eNB sends a handover required message to an MME according to the measurement report, where the handover required message carries the third ECGI and the first TAI, so that the MME obtains the DeNB_ID according to the first TAI, and sends a handover request message to the DeNB, where the handover request message carries the third ECGI and indicates that the UE requests to be handed over from the eNB to the RN.

In the embodiment of the present invention, when an X2 interface is set up between the RN and the DeNB, the RN reports the third ECGI to the DeNB. When an S1 interface is set up between the RN and the DeNB, the DeNB allocates the first TAI to the RN, and the following principles are followed when the DeNB allocates the first TAI to the RN: different TAIs are allocated to RNs under different DeNBs, and no TAI shared by DeNBs is allocated to the RN. After receiving the first TAI allocated by the DeNB, the RN sends a system information broadcast message carrying the first TAI and the third ECGI to all UEs in a converge area. When a certain UE that is in a connection state moves from a cell of the eNB to a cell of the RN, the UE receives a system information broadcast message that carries the first TAI and the third ECGI and is sent by the RN, and further sends a measurement report to the eNB, where the measurement report carries the third ECGI and the first TAI that are obtained by the UE from the system information broadcast message received from the RN; and the eNB sends a handover required message to the MME according to the measurement report, where the handover required message carries the third ECGI and the first TAI, so that the MME obtains the DeNB_ID according to the first TAI, and sends the handover request message of handing over from the eNB to the RN to the DeNB. Because the first TAI is corresponding to a DeNB_ID uniquely, the MME can obtain the DeNB_ID according to the first TAI, and send the handover request message carrying the third ECGI to the DeNB. After receiving the handover request message forwarded by the DeNB, the RN performs, according to the handover request message, a control operation of accessing the RN on the UE.

Through the handover method in a relay network according to the embodiment of the present invention, the first TAI that identifies the RN is allocated to the RN, so that the MME can obtain the DeNB_ID according to the first TAI, and the UE can be normally handed over from the eNB to the RN in the relay network.

Figure 10:
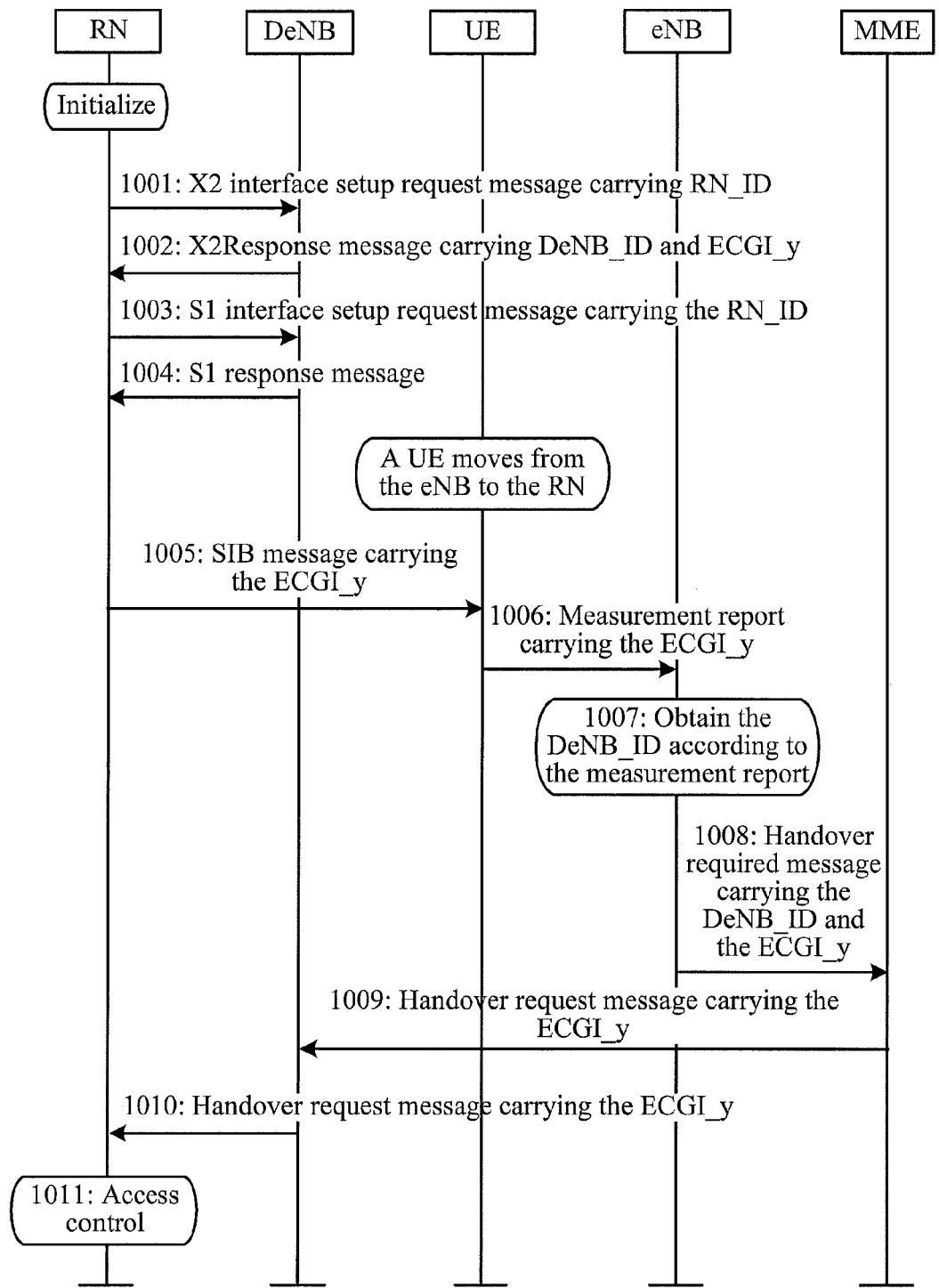
FIG. 10 is a flow chart of an embodiment of a handover method in a relay network according to the present invention.

FIG. 10 is a flow chart of an embodiment of a handover method in a relay network according to the present invention. As shown in FIG. 10, an embodiment of the present invention provides a handover method in a relay network, which specifically includes the following:

Step 1001: An RN sends an X2 interface setup request message ("X2_Setup_Request(RN_ID, . . . )") carrying an identifier of the RN (RN_ID) to a DeNB.

Step 1002: The DeNB returns a response message ("X2_Setup_Response(DeNB_ID,ECGI_y, . . . )") carrying DeNB_ID and a first ECGI that is allocated by the DeNB.

Step 1003: The RN sends an S1 interface setup request message ("S1_Setup_Request(RN_ID, . . . )") carrying the RN_ID to the DeNB.

Step 1004: The DeNB returns a response message ("S1_Setup_Response( . . . )") to the RN;

Step 1005: When a UE that is in a connection state moves from a cell of an eNB to a cell of the RN, the UE receives a system information broadcast (System Information Broadcast; SIB) message ("SIB(ECGI_y, . . . )") that carries the first ECGI and is sent by the RN to all UEs in a coverage area.

Step 1006: The UE sends a measurement report ("Measurement_Report(ECGI_y, ... )") carrying the first ECGI to the eNB.

Step 1007: The eNB obtains the DeNB_ID according to the measurement report;

Step 1008: The eNB sends a handover required message ("Handover_Required(DeNB_ID,ECGI_y, ... )") carrying the DeNB_ID and the first ECGI to the MME.

Step 1009: The MME sends a handover request message ("Handover_Request(ECGI_y, ... )") carrying the first ECGI to a corresponding DeNB according to the DeNB_ID.

Step 1010: The DeNB forwards the handover request message to the RN.

Step 1011: The RN performs a control operation of accessing the RN on the UE.

Through the handover method in a relay network according to the embodiment of the present invention, when an interface is set up between the RN and the DeNB, the DeNB allocates the first ECGI that identifies the RN to the RN, so that the eNB can obtain the DeNB_ID according to the first ECGI, and the UE can be normally handed over from the eNB to the RN in the relay network.

Figure 11:
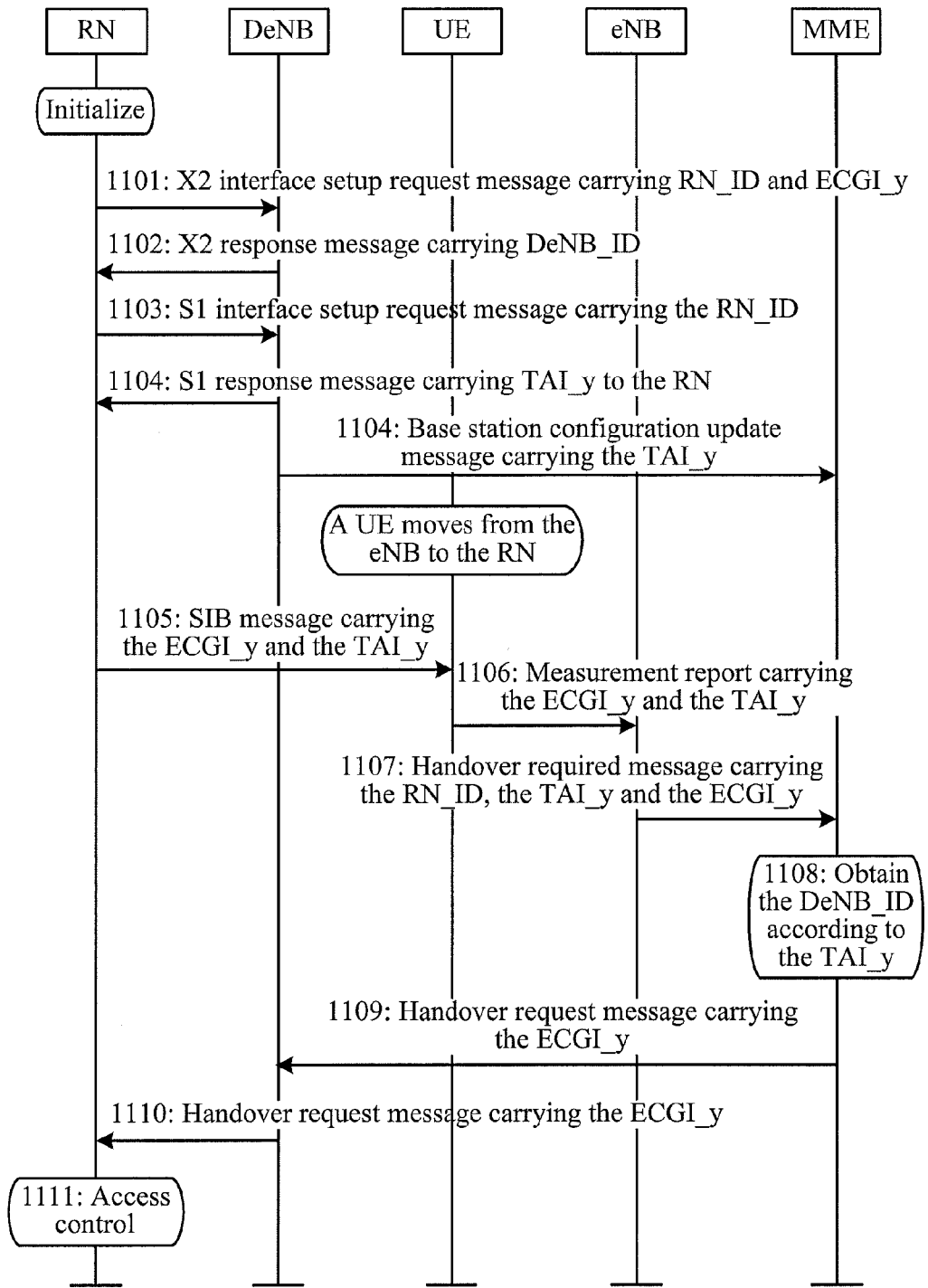
FIG. 11 is a flow chart of an embodiment of a handover method in a relay network according to the present invention.

FIG. 11 is a flow chart of an embodiment of a handover method in a relay network according to the present invention. As shown in FIG. 11, an embodiment of the present invention provides a handover method in a relay network, which specifically includes the following:

Step 1101: An RN sends an X2 interface setup request message ("X2_Setup_Request(RN_ID, ECGI_y, ... )") carrying RN_ID and a third ECGI to a DeNB.

Step 1102: The DeNB returns a response message ("X2_Setup_Response(DeNB_ID, ... )") carrying DeNB_ID.

Step 1103: The RN sends an S1 interface setup request message ("S1_Setup_Request(RN_ID, ... )") carrying the RN_ID to the DeNB.

Step 1104: The DeNB returns a response message ("S1_Setup_Response(TAI_y, ... )") carrying a first TAI to the RN, and sends a base station configuration update message ("eNB_Configuration_Update(TAI_y, ... )") carrying the first TAI to an MME.

Step 1105: When a UE that is in a connection state moves from a cell of an eNB to a cell of the RN, the UE receives a SIB message ("SIB(ECGI_y,TAI_y, ... )") that carries the third ECGI and the first TAI and is sent by the RN to all UEs in a coverage area.

Step 1106: The UE sends a measurement report ("Measurement_Report(ECGI_y,TAI_y, ... )") carrying the third ECGI and the first TAI to the eNB;

Step 1107: The eNB sends a handover required message ("Handover_Required(RN_ID,TAI_y,ECGI_y, ... )") carrying the RN_ID, the first TAI and the third ECGI to the MME.

Step 1108: The MME obtains the DeNB_ID according to the TAI_y.

Step 1109: The MME sends, according to the DeNB_ID, a handover request message ("Handover_Request(ECGI_y, ... )") carrying the third ECGI to the DeNB that controls the RN.

Step 1110: The DeNB forwards the handover request message to the RN.

Step 1111: The RN performs a control operation of accessing the RN on the UE.

Through the handover method in a relay network according to the embodiment of the present invention, when an interface is set up between the RN and the DeNB, the DeNB allocates the first TAI uniquely corresponding to a DeNB to the RN, so that the MME can obtain the DeNB_ID according to the first TAI, and the UE can be normally handed over from the eNB to the RN in the relay network.

Figure 12:
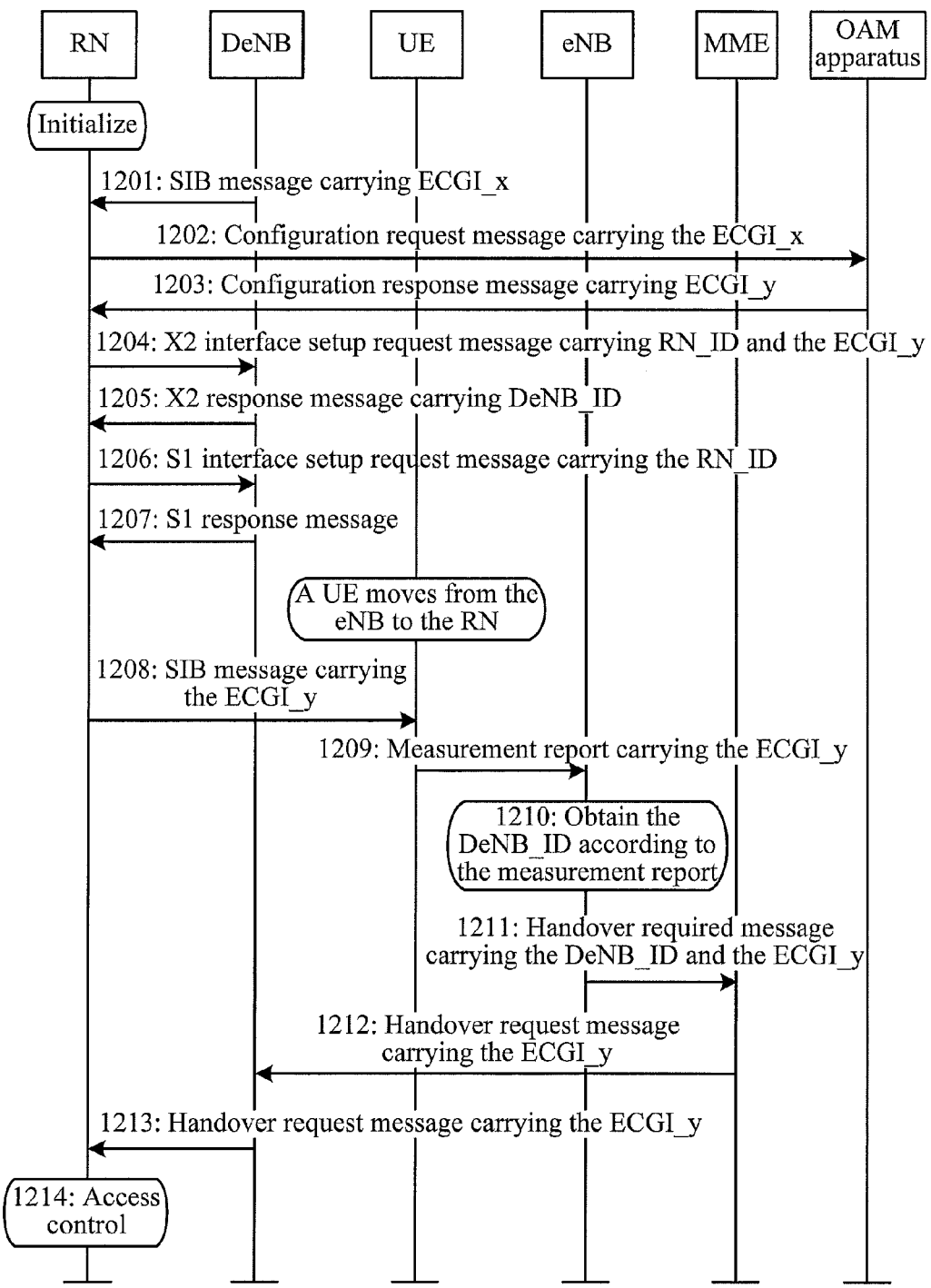
FIG. 12 is a flow chart of an embodiment of a handover method in a relay network according to the present invention.

FIG. 12 is a flow chart of an embodiment of a handover method in a relay network according to the present invention. As shown in FIG. 12, an embodiment of the present invention provides a handover method in a relay network, which specifically includes the following:

Step 1201: An RN receives a SIB message ("SIB(ECGI_x, ... )") that carries a second ECGI identifying a DeNB and is sent by the DeNB.

Step 1202: The RN sends a configuration request message ("RN_Configuration_Request(ECGI_x, ... )") carrying the second ECGI to an OAM apparatus.

Step 1203: The OAM apparatus returns a configuration response message ("RN_Configuration_Response(ECGI_y, ... )") carrying a first ECGI to the RN.

Step 1204: The RN sends an X2 interface setup request message ("X2_Setup_Request(RN_ID, ECGI_y, ... )") carrying RN_ID and the first ECGI to the DeNB.

Step 1205: The DeNB returns a response message ("X2_Setup_Response(DeNB_ID, ... )") carrying DeNB_ID.

For steps 1206-1214, see steps 1003-1011.

Through the handover method in a relay network according to the embodiment of the present invention, before an interface is set up between the RN and the DeNB, the OAM apparatus allocates the first ECGI that includes the DeNB_ID and is not used by the DeNB to the RN, so that the UE can be normally handed over from the eNB to the RN in the relay network.

Figure 13:
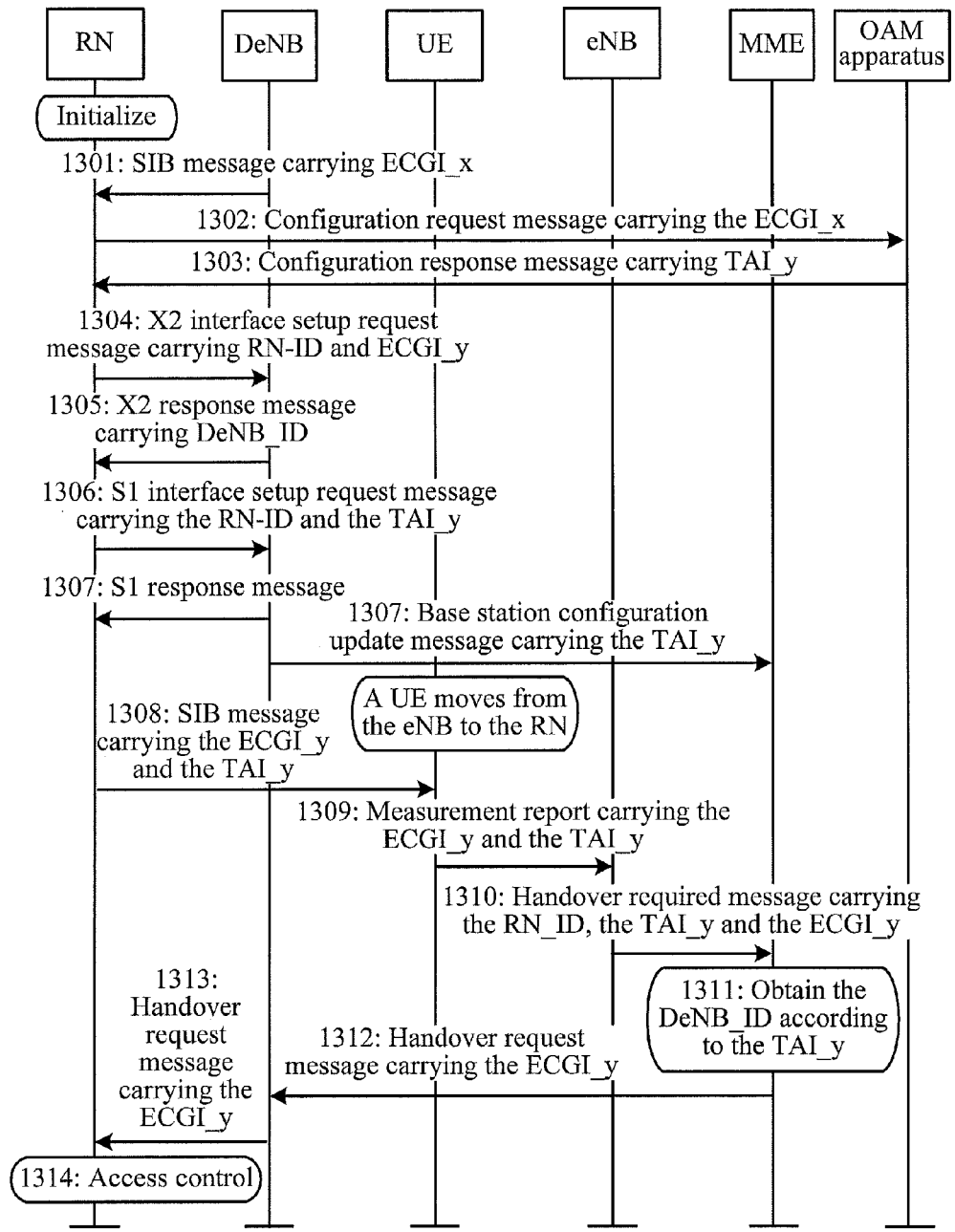
FIG. 13 is a flow chart of an embodiment of a handover method in a relay network according to the present invention.

FIG. 13 is a flow chart of an embodiment of a handover method in a relay network according to the present invention. As shown in FIG. 13, an embodiment of the present invention provides a handover method in a relay network, which specifically includes the following:

Step 1301: An RN receives a SIB message ("SIB(ECGI_x, ... )") that carries a second ECGI identifying a DeNB and is sent by the DeNB.

Step 1302: The RN sends a configuration request message ("RN_Configuration_Request(ECGI_x, ... )") carrying the second ECGI to an OAM apparatus.

Step 1303: The OAM apparatus returns a configuration response message ("RN_Configuration_Response(TAI_y, ... )") carrying a first TAI to the RN.

Step 1304: The RN sends an X2 interface setup request message ("X2_Setup_Request(RN_ID, ECGI_y, ... )") carrying RN_ID and a third ECGI to the DeNB.

Step 1305: The DeNB returns a response message ("X2_Setup_Response(DeNB_ID, ... )") carrying DeNB_ID.

Step 1306: The RN sends an S1 interface setup request message ("S1_Setup_Request(RN_ID,TAI_y, ... )") carrying the RN_ID and the first TAI to the DeNB.

Step 1307: The DeNB returns a response message ("S1_Setup_Response( ... )") to the RN, and sends a base station configuration update message ("eNB_Configuration_Update(TAI_y, ... )") carrying the first TAI to an MME.

For steps 1308-1314, see steps 1105-1111.

Through the handover method in a relay network according to the embodiment of the present invention, before an interface is set up between the RN and the DeNB, the OAM apparatus allocates the first TAI uniquely corresponding to a DeNB to the RN, so that the UE can be normally handed over from the eNB to the RN in the relay network.

Figure 14:
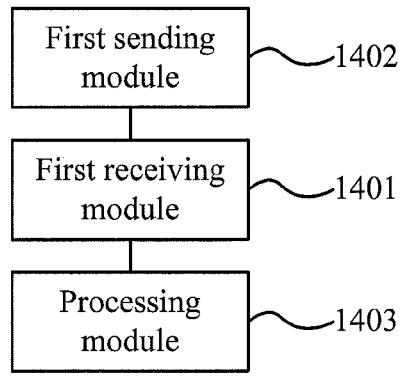
FIG. 14 is a schematic structural diagram of an embodiment of a relay node according to the present invention.

FIG. 14 is a schematic structural diagram of an embodiment of a relay node according to the present invention. As shown in FIG. 14, an embodiment of the present invention provides a relay node, including: a first receiving module 1401, a first sending module 1402 and a processing module 1403. The first receiving module 1401 is configured to receive a first area identifier that identifies the relay node and a handover request message that is forwarded by the DeNB according to the first area identifier. The first sending module 1402 is configured to send a system information broadcast message carrying first area identifier that is received by the first receiving module 1401 to UEs in a coverage area. The processing module 1403 is configured to perform, according to the handover request message received by the first receiving module 1401, a control operation of accessing the relay node on the UE.

Specifically, the first receiving module 1401 is further configured to receive a response message of the DeNB for an interface setup request message, where the response message carries the first area identifier allocated by the DeNB. The interface setup request message includes an X2interface setup request message. The response message includes an X2 response message corresponding to the X2 interface setup request message. The first area identifier allocated by the DeNB is a first ECGI carried in the X2 response message, and the first ECGI includes DeNB_ID.

Or, the interface setup request message includes an X2 interface setup request message and an S1 interface setup request message, and the X2 interface setup request message carries the a third ECGI to be reported to the DeNB. The response message includes an X2 response message corresponding to the X2 interface setup request message and an S1 response message corresponding to the S1 interface setup request message. The first area identifier allocated by the DeNB is a first TAI carried in the S1 response message, and the first TAI is corresponding to a DeNB_ID uniquely.

In addition, the first receiving module 1401 may further be configured to receive a system information broadcast message that carries a second ECGI that identifies the DeNB and is sent by the DeNB; send a configuration request message carrying the second ECGI to an OAM apparatus; and receive a configuration response message that carries the first area identifier and is returned by the OAM apparatus according to the second ECGI, where the first area identifier is a first ECGI including the DeNB_ID or a first TAI uniquely corresponding to a DeNB_ID.

Through the relay node according to the embodiment of the present invention, a first area identifier that identifies the RN is allocated to the RN, so that the UE can be normally handed over from the eNB to the RN in the relay network.

Figure 15:
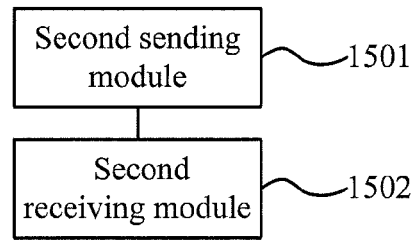
FIG. 15 is a schematic structural diagram of an embodiment of a control base station according to the present invention.

FIG. 15 is a schematic structural diagram of an embodiment of a control base station according to the present invention. As shown in FIG. 15, an embodiment of the present invention provides a control base station, including: a second sending module 1501 and a second receiving module 1502. The second sending module 1501 is configured to send a response message to an RN according to a received interface setup request message, where the response message carries a first area identifier that identifies the RN and is allocated to the RN. The second receiving module 1502 is configured to receive a handover request message that is sent by an MME according to the first area identifier, and forward the handover request message to the RN, so that the RN performs, according to the handover request message, a control operation of accessing the RN on the UE.

Further, the interface setup request message includes an X2 interface setup request message, and the response message includes an X2 response message corresponding to the X2interface setup request message. The allocated first area identifier is a first ECGI carried in the X2response message, and the first ECGI includes an identifier of the DeNB (DeNB_ID).

Or, the interface setup request message includes an X2 interface setup request message and an S1 interface setup request message, and the X2 interface setup request message carries a third ECGI to be reported to the DeNB. The response message includes an X2 response message corresponding to the X2 interface setup request message and an S1 response message corresponding to the S1 interface setup request message. The allocated first area identifier is a first TAI carried in the S1 response message, and the first TAI is corresponding to an identifier of the DeNB (DeNB_ID) uniquely.

Further, the second sending module 1501 may be further configured to send a base station configuration update message to the MME, where the base station configuration update message carries a first area identifier, and the first area identifier is a first TAI carried in the S1response message, and the first TAI is corresponding to a DeNB_ID uniquely.

Through the control base station according to the embodiment of the present invention, a first area identifier that identifies the RN is allocated to the RN, so that the UE can be normally handed over from the eNB to the RN in the relay network.

Figure 16:
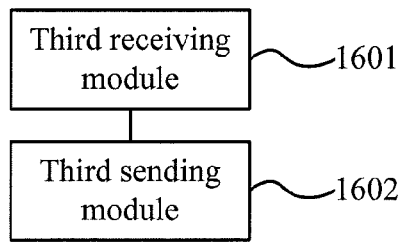
FIG. 16 is a schematic structural diagram of an embodiment of a base station according to the present invention.

FIG. 16 is a schematic structural diagram of an embodiment of a base station according to the present invention. As shown in FIG. 16, an embodiment of the present invention provides a base station, including: a third receiving module 1601 and a third sending module 1602. The third receiving module 1601 is configured to receive a measurement report sent by a UE, where the measurement report carries a first area identifier obtained by the UE from a system information broadcast message that is received from an RN. The third sending module 1602 is configured to send a handover required message to an MME according to the first area identifier, so that the MME sends, according to the first area identifier, a handover request message to a DeNB that controls the RN, where the handover request message indicates that the UE requests to be handed over from the base station to the RN.

Further, the first area identifier carried in the measurement report is a first ECGI, and the first ECGI includes DeNB_ID. At this time, the third sending module 1602 is further configured to obtain, according to the first ECGI carried in the measurement report, the DeNB_ID, and send a handover required message to the MME, where the handover required message carries the DeNB_ID and the first ECGI; or, the third sending module 1602 is configured to directly send a handover required message to the MME, where the handover required message carries the first ECGI, so that the MME obtains the DeNB_ID according to the first ECGI.

Further, the first area identifier carried in the measurement report is a first TAI, and the first TAI is corresponding to a DeNB_ID uniquely. At this time, the third sending module 1602 is further configured to send a handover required message to the MME, where the handover required message carries the third ECGI and the first TAI, so that the MME obtains the DeNB_ID according to the first TAI, and sends a handover request message carrying the third ECGI to the DeNB.

Through the base station according to the embodiment of the present invention, a first area identifier that identifies the RN is allocated to the RN, so that the UE can be normally handed over from the eNB to the RN in the relay network.

Figure 17:
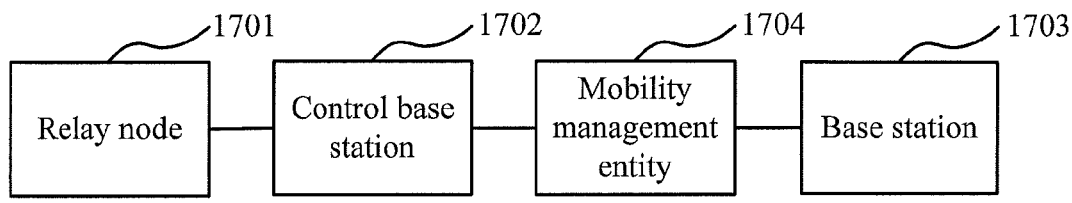
FIG. 17 is a block diagram of an embodiment of a handover system in a relay network according to the present invention.

FIG. 17 is a block diagram of an embodiment of a handover system in a relay network. As shown in FIG. 17, an embodiment of the present invention provides a handover system in a relay network, including: a relay node 1701, a control base station 1702, a base station 1703 and a mobility management entity 1704. The relay node 1701 is configured to receive a first area identifier that identifies the relay node 1701; send a system information broadcast message carrying the first area identifier to a UE in a coverage area; receive a handover request message, which is forwarded by the control base station 1702 according to the first area identifier; and perform, according to the handover request message, a control operation of accessing the relay node 1701 on the UE. The control base station 1702 is configured to send a response message to the relay node 1701 according to a received interface setup request message, where the response message carries the first area identifier that identifies the relay node 1701 and is allocated to the relay node 1701; receive a handover request message that is sent by the mobility management entity 1704 according to the first area identifier; and forward the handover request message to the relay node 1701, so that the relay node 1701 performs, according to the handover request message a control operation of accessing the relay node 1701 on the UE. The base station 1703 is configured to receive a measurement report sent by the UE, where the measurement report carries the first area identifier obtained by the UE from the system information broadcast message that is received from the relay node 1701; according to the first area identifier, send a handover required message to the mobility management entity 1704, so that the mobility management entity 1704 sends, according to the first area identifier, a handover request message to the control base station 1702 that controls the relay node 1701, where the handover request message indicates that the UE requests to be handed over from the base station 1703 to the relay node 1701.

Functions of each module in this system embodiment are the same as the specific description in the embodiments shown in FIG. 14-FIG. 17, and details are not described here again.

Through the handover system in a relay network according to the embodiment of the present invention, a first area identifier that identifies the RN is allocated to the RN, so that the UE can be normally handed over from the eNB to the RN in the relay network.

Persons of ordinary skill in the art may understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The above storage medium may be any medium that is capable of storing program codes, such as an ROM, an RAM, a magnetic disk, and an optical disk.

Finally, it should be noted that, the above embodiments are merely provided for describing the technical solutions of the present invention, but not intended to limit the present invention. It should be understood by persons of ordinary skill in the art that, although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present invention.

What is claimed is:

1. A handover method in a relay network, comprising:
 sending, by a control base station, a response message to a relay node according to a received interface setup request message, wherein the response message carries a first area identifier allocated to the relay node when an interface is setup to connect the relay node; and
 receiving a handover request message sent by a mobility management entity, and forwarding the handover request message to the relay node by identifying the relay node from the first area identifier obtained from the response message, so that the relay node performs, according to the handover request message, a control operation enabling access to the relay node from a terminal, and
 wherein the first area identifier enables the mobility management entity to send the handover request message to the control base station.

2. The handover method in the relay network according to claim 1, wherein the allocated first area identifier is a first evolved universal terrestrial radio access network cell global identifier ECGI carried in the response message, and the first ECGI comprises an identifier of the control base station.

3. The handover method in the relay network according to claim 1, wherein the allocated first area identifier is a first tracking area identity carried in the response message, and the first tracking area identity is corresponding to an identifier of the control base station.

4. The handover method in the relay network according to claim 3, further comprising:
 sending a base station configuration update message to the mobility management entity, wherein the base station configuration update message carries the first tracking area identity.

5. The handover method in the relay network according to claim 1, wherein a portion of the first area identifier represent an identifier of the control base station, and the hand over request message is sent in accordance with the identifier of the control base station.

6. A control base station, comprising:
 a transceiver configured to:
  send a response message to a relay node according to a received interface setup request message, wherein the response message carries a first area identifier allocated to the relay node; and
  receive a handover request message sent by a mobility management entity, the handover request message carrying the first area identifier and the first area identifier enabling the mobility management entity to send the handover request message to the control base station, and
 a processor coupled to the transceiver, configured to identify the relay node from the first area identifier obtained from the response message, and
 wherein the transceiver is configured to forward the handover request message to the relay node identified by the processor.

7. The control base station according to claim 6, wherein, the transceiver is configured to send a base station configuration update message to the mobility management entity; the base station configuration update message carries the first area identifier; the first area identifier is a first tracking area identity carried in the response message; and the first tracking area identity is corresponding to an identifier of the control base station uniquely.

8. A handover method in a relay network, comprising:
 allocating, by a control base station, a first area identifier to a relay node when an interface is setup to connect the relay node;
 forwarding a handover request message to the relay node by identifying the relay node using the first area identifier, the relay node performing a control operation enabling access to the relay node from a terminal according to the handover request message, and wherein the handover request message is sent to the control base station that is identified by a mobility management entity using the first area identifier.

9. The handover method in the relay network according to claim 8, wherein system information broadcast message carrying the first area identifier is sent to terminals in a coverage area.

* * * * *